United States Patent Office 2,833,754
Patented May 6, 1958

2,833,754

PROCESS OF SUSPENSION POLYMERIZATION OF VINYL HALIDE UTILIZING GELATIN AS DISPERSING AGENT

Roger G. Richards, Painesville, and James J. Lukes, Euclid, Ohio, assignors to Diamond Alkali Company, Cleveland, Ohio, a corporation of Delaware No Drawing. Application March 14, 1955
Serial No. 494,259

6 Claims. (Cl. 260—92.8)

This invention relates to the production of synthetic resins, and is more particularly concerned with the production of resins comprising polyvinyl chloride.

The invention is concerned primarily with improvements in what is known as "granular" polymerization. Granular polymerization is known also as "pearl" polymerization and "suspension" polymerization, the three terms being synonymous. More particularly, the invention is concerned with the production of high-quality, general-purpose, polymeric material by the granular polymerization method, such that the stock material so produced may be employed, in the vast majority of cases, for whatever purpose and in whatever manner may be desired. Those skilled in the art will recognize the ambitiousness of the undertaking because of the multiplicity of characteristics that are necessary in order for a stock material to be so generally acceptable. Although the invention is not restricted to the polymerization of a single monomeric material, for purposes of simplicity, the description of the invention is centered upon the production of polyvinyl chloride, the properties thereof that characterize high-quality, general-purpose stock material, problems that have been encountered in the past in its production, and the improvements wrought by this invention whereby those problems are overcome.

The general procedure that is followed in carrying out polymerization reactions according to the granular polymerization method is now well-known to involve the suspension of the monomer in water and, while suspended, effecting polymerization. Heat and catalysts are employed as polymerization aids and the suspension is maintained during the course of the reaction by stabilizing the system with one or more of a number of materials known as suspension stabilizers, for example, methyl cellulose, polyvinyl alcohol, sodium alginates, gum tragacanth, and the like. When the polymerization reaction is complete, in well-handled processes, a goodly portion of the polymer may be recovered in particle or granular form by filtration or centrifugation without the aid of any additional specific means. The product is thereafter washed and dried, after which it is ready for market. This type of process has several outstanding advantages over the process of polymerizing which is known as "emulsion" polymerization.

Emulsion polymerization is conducted in a system in which the monomeric material is dispersed in water by means of a surface-active agent to form an emulsion. Polymerization is carried out with the aid of heat and a water-soluble catalyst. This procedure differs from suspension polymerization in many respects, not the least important of which is the use of a water-soluble catalyst. Normally, suspension polymerization employs only oil-soluble catalysts.

At the conclusion of the emulsion polymerization, the polymerization product remains dispersed in the system as a finely-divided mass that is referred to as a latex. In order to recover the product, it is necessary to effect coagulation of the latex whereby the emulsion system is broken and the polymer is precipitated. This may be accomplished by adding an electrolyte to the latex but such addition of electrolyte is usually undesirable for reasons to be stated. Accordingly, mechanical means may be resorted to in order to break the emulsion. However, even if mechanical means are used to break the emulsion, the residual electrolyte from both the catalyst and the emulsifying agents is still associated with the precipitated polymer.

The precipitate is extremely difficult to wash free of electrolytes whether present for polymerization or coagulation purposes. Hence, the final product usually contains impurities which render it quite inferior for a number of its important uses. In particular, it is almost impossible to prepare a material of good clarity such as is most desirable for use in preparing films and sheets. Secondly, where the product is to be employed in certain electrical applications, its dielectric properties are severely impaired even where great care is employed in washing the product. The objectionable materials cannot be removed to the necessary extent without applying lengthy washing procedure. Depending upon the degree of impurities present, strength properties of the product may be impaired. Because of the difficulty of washing the precipitate, emulsion polymerization is costly and it is primarily because of this and the above-noted disadvantage that attention in recent years has been directed to a greater degree toward the granular polymerization method. This latter method, as indicated above, when managed properly, results in the formation of a granular mass that may be washed free of impurities with ease and quite simply dried.

There are many variations of the granular polymerization method generaly described above. These variations appear in the art because of specific difficulties that are encountered in its practice. The simple change from emulsion polymerization to granular polymerization does not lead to problem-free operation. In fact, some of the difficulties that are encountered in emulsion polymerization are encountered also in granular polymerization, notably, the production of a stock material which, when processed to form products, contain what is known to the art as "fisheyes." In the production of a high-quality, general-purpose polymeric material, it is perhaps misdescriptive to refer to any particular disadvantage as being most important. However, if any single one is most important, the disadvantage of fisheye formation is it. This is because of the fact that all products formed from fisheye-producing polymeric stock are inferior in quality in several important functional aspects, depending upon the number and size of fisheyes present.

Fisheyes may be visualized as small blotches, actually having the appearance of the eyes of a fish, in the final plasticized polymeric product. They are believed to result from the failure of some of the individual particles of the polymer stock to associate with the plasticizer. Thus, as to substance, they are merely small particles of unplasticized polymer surrounded by relatively large seas of plasticized polymer. Since the plasticized material is intended to be homogeneous, fisheyes indicate poor homogeneity and are imperfections in the final product. A relatively small number of fisheyes can be tolerated in the final product; in fact, it appears impossible to eliminate them completely by any process. The seriousness of their presence in large numbers may be indicated by the following comments which refer to the undesirable effects that they have.

Excellent transparency of polyvinyl chloride in some applications, for example, sheets and films, is an absolute necessity, both functionally and appearance-wise. Where such products contain a substantial number of fisheyes, they are not clear and transparent; instead, they present a hazy appearance and may be degraded in clarity to the point of mere translucency. As noted above, dielectric strength in some electrical applications is important and where the product contains many fisheyes, it is unsuitable for these uses because of the reduced dielectric strength. Additionally, fisheyes result in the formation of a rough, uneven surface which cannot be smoothed. Products containing fisheyes are low in structural strength; especially the tear resistance of polyvinyl chloride sheets is seriously impaired. Fisheyes are undesirable for still other reasons which need not be mentioned in view of the ones above noted.

The problem of fisheyes can hardly be over-emphasized. Their presence has been studied extensively by most highly skilled artisans who recognize them as being the most serious single problem in the production of high-quality polyvinyl chloride products. As will appear from the discussion hereinafter of the present invention, the premise suggested above provides a reasonably valid point of departure from which their presence may be understood and controlled.

While, as noted above, the polymeric mass that is produced by a properly managed granular polymerization method may be quite easily and quickly washed free of impurities and is easily dried, it is extremely difficult to control the particle size of the granular mass that is formed, whereby such ease of washing and drying is attained.

From the standpoint of operating efficiency, and thus the commercial advantage in low costs that the granular polymerization process affords, the problem of obtaining uniform particle size is equally as serious as the problem of fisheyes. In the first place, it will be recalled from the foregoing paragraphs that the polymerized product must be separated from the aqueous medium. This may be accomplished by usual filtration or centrifuging methods provided that the product is within a suitable particle size range. If the particle size is too small, separation will be difficult and extremely slow and, in fact, may be impossible in the practical sense. A mass of small particles holds the occluded suspending medium and prevents its release from the mass. Also, the particles themselves may pass through the filter along with the liquid. On the other hand, if the particle size is too large or if the particles are not of a uniform desired size, serious obstacles are encountered in processing the polymer to its final product stage. Because of the processing requirement for handling larger particles, an inferior product results.

Various attempts have been made to explain the reason for the formation of large globules or agglomerates of the polymer. It has been reported that during the polymerization reaction, the mass passes through a sticky, tacky state which is not broken up completely in the succeeding phase of the reaction and that violent agitation only seems to increase the tendency toward agglomeration. Also, it is reported that the reaction rate and the temperature in the reaction zone is thought to be responsible for the problem. These possibilities need not be denied here as they may be entirely valid assumptions when considered in the light of the particular process in which they originate. However, it is suggested herein that the proper approach to solving the problem of uniform particle size resides in the basic suspension system itself, and that, if the suspension system is proper, a preferred particle size can be obtained, and other conditions, such as temperature, reaction rate and agitation stand reduced in power of influence upon particle size.

It may be said in respect of such other explanations and the mentioned conditions that unquestionably there appear to be optimum reaction rates, temperature limits and conditions of agitation which desirably should be correlated with a basic suspension system and such are indicated hereinafter in connection with the process of this invention. It should be noted that among the most important properties generally regarded as requisite in high-quality, general-purpose polyvinyl chloride are dielectric properties, heat stability, plasticizer compatibility under processing conditions, high strength properties, clarity and color, high bulk density, and processability. As noted above in part, these properties, for the most part, are either attained or fallen short of, depending upon the control of fisheyes and particle size and, further, as noted above, these two conditions depend in turn upon the operating techniques that are employed in the granular polymerization process.

It has now been determined that despite the variety of environmental conditions affecting the polymerization reaction, an excellent control of particle size distribution in the resultant polymer can be effected by the practice of this invention. Before describing the present process in detail, it will aid in an understanding of the invention to point out that the discovery has been made that the final particle size distribution is largely determined during the formation of the initial monomer-water suspension. It has further been observed in many instances that the most stable suspension possible is obtained by establishing the desired particle size at a pH greater than the isoelectric point of the dispersing agent employed. As used in the specification and claims, the expression "isoelectric point" is intended to mean the point of electric neutrality or zero potential, hence, the pH value at which a substance is neutral.

While it is advantageous to form a monomer-water suspension at a relatively high pH in order to insure as stable a dispersion as possible, effecting polymerization at such a high pH has been found to be disadvantageous in many instances. Contrariwise, polymeric products having excellent colloidability and particle porosity are obtained by polymerization at a pH lower than the isoelectric point of the dispersing agent. However, a low pH generally tends to reduce the suspending action of the dispersing agent. Accordingly, if a high pH value is employed throughout the formation of a monomer-water suspension and subsequent polymerization, which procedure would insure a stable suspension, other desirable polymer properties are impaired. On the other hand, if the entire procedure is carried out at a low pH in order to obtain proper colloidability and particle porosity, accurate control of polymer particle size distribution is a difficult problem.

It is, therefore, a principal object of this invention to avoid the foregoing difficulties and to provide a polymerization process which permits not only excellent polymer particle size control but also provides excellent colloidability and particle porosity.

A further object is to provide a new and improved polymerization process for the manufacture of polymers having a predetermined particle size distribution.

These and other objects and advantages of this invention will appear more fully from the following description.

The process of this invention comprises carrying out a polymerization reaction from an initial monomer-water suspension which is established with the aid of dispersing agent under conditions which permit the formation of the most stable dispersion possible, and thereafter polymerizing the thus-dispersed monomeric material under different conditions with the aid of heat and a catalyst.

The practice of the present invention is particularly advantageous in systems employing amphoteric dispersing agents such as gelatin. In such systems, it is a feature of the invention first to form a monomer-water dispersion at a pH at least equal to, and preferably greater than, the isoelectric point of the particular gelatin employed and subsequently to effect polymerization at a pH less than the isoelectric point. In many instances, it will be understood, of course, that the initial stable monomer dispersion can be effected at the unadjusted or ambient pH value of the monomer-water mixture so long as this pH is greater than the isoelectric value of the dispersing agent employed. At times, depending on the particular application, it may be necessary initially to raise or adjust the pH of the monomer-water mixture, while forming the desired stable suspension, by addition of basic materials to insure that the isoelectric point of the suspending agent is exceeded.

Numerous attempts have been made by highly skilled chemists to polymerize vinyl chloride with the aid of gelatin as a suspension stabilizer, whereby a product, such as is sought herein, may be produced. According to recurring indications in the literature, it seems to be well-established that conventional systems including gelatin as the sole suspension aid fall far short of what is required in the industry and that serious problems attend its use. It was reported very early in the literature that gelatin is a suitable suspension stabilizer. However, experimental operations in accordance with the broad early teachings serve only to reveal the serious difficulties described above. According to this invention, it has been discovered in the very face, so to speak, of the difficulties of the sundry prior teachings that a high-quality, general-purpose product, notably, polyvinyl chloride, can be produced, typically employing a small controlled quantity of gelatin as a suspension stabilizer, by establishing a stable monomer-water suspension under ambient pH conditions, i. e., at a pH greater than the pH of the isoelectric point of the gelatin in the case of alkali-hydrolyzed gelatin, and thereafter reducing the pH and effecting polymerization while maintaining the pH in the system throughout the polymerization below or on the acid side of the isoelectric point of the gelatin. Such a procedure utilizes the gelatin at a preferred pH to produce a stable dispersion of monomer, and thereafter accomplishes polymerization at a lowered pH under conditions which impart both excellent colloidability and particle porosity to the resultant polymeric product.

Gelatin is known to be an exceedingly complex proteinaceous substance which is derived from animal substance by various processes. The material is commercially available in three slightly different forms, all of which are useful in the practice of this invention. These forms are a so-called acid hydrolyzed product, a so-called alkali, i. e., lime, hydrolyzed product, and a non-ionized form obtained by hot water hydrolysis of animal substance. These materials, as supplied commercially, vary slightly in their isoelectric pH's, namely from about 7 to 8.2 for the acid product, about 4.8 to 5 for the alkali product, and about 4.7 for the non-ionized form. While the present invention may be practiced employing any of these three forms of gelatin, the alkali hydrolyzed material has been found to have excellent usefulness.

Accordingly, it is a feature of this invention to conduct the polymerization, employing alkali hydrolyzed gelatin as a dispersing agent, by first establishing a stable suspension of monomer in water with the aid of the gelatin at a pH in excess of its isoelectric point, thereafter reducing the pH of the system by addition of an acid, such as phosphoric acid, or otherwise, to a pH less than the isoelectric point of the gelatin, and effecting polymerization with the aid of heat and a catalyst. In practice, excellent results are obtained by establishing a stable suspension of monomer in water at a pH greater than about 5.0 to 6.8 and subsequently lowering the pH to a value of about 2 and 5, particularly between 2.5 and 4, and effecting polymerization while maintaining a pH within this range employing heat, a catalyst, and continuous agitation during the polymerization. It appears that when employing an alkali hydrolyzed gelatin, superior results are obtained when the pH during polymerization is maintained at a value within the range of from about 2.7 to 3.2, which, of course, is substantially below the isoelectric point of the alkali hydrolyzed gelatin.

In addition, it has been found that the ultimately obtained product comprises particles of a size rendering them readily worked with a plasticizer and the like and, moreover, particles having high porosity, which of course is desirable from the standpoint of acceptance of the plasticizer. It is apparent from the extended experimentation leading to the present invention that the phenomenon obtained by conducting the polymerization employing gelatin as a suspending agent, and at a pH below the isoelectric point of the gelatin, is largely responsible for the advantageous results obtained, particularly with respect to the production of fisheyes, when the reaction is carried out in accordance with the preferred conditions hereof are minimum in number and relatively small in size.

In carrying out the method of this invention, the obtention of a stable monomer-water suspension and subsequent lowering of the pH before effecting polymerization is most conveniently accomplished by forming a stable monomer-water suspension under ambient pH conditions above the isoelectric point of the dispersing agent, thereafter continuing agitation for a predetermined period of time until the desired particle size is determined, subsequently introducing a small amount of acid to lower the pH below the isoelectric point of the gelatin or other amphoteric dispersing agent, and then effecting polymerization with the aid of heat and a catalyst.

In practice, the specific time interval in which a stable monomer-water suspension is established before addition of acid or other material capable of lowering the pH is dictated by the particular polymerization system. However, it has been found in the polymerization of vinyl chloride, using gelatin as a suspending agent, that it is advantageous to add vinyl chloride monomer and gelatin to water and agitate for a period ranging from a few minutes, e. g., 5 minutes, to one hour or more before adding catalyst and acid. At present, it is preferred to delay the addition of acid for about 30 minutes after agitation of the water-monomer mixture is begun. In large-scale applications, it will be understood that a more extended delay generally is desirable in order to permit the monomer-water dispersion to reach the desired reaction temperature before lowering the pH. Hence, in such applications, periods of delay of up to one hour or more after the desired reaction is reached are typical. The resultant polymer exhibits an improved particle size range while also having excellent colloidability and particle porosity. Within limits, it has been found that polymer particle size distribution is generally proportional to the period of delay, i. e., the longer the period of delay before the pH is lowered below the isoelectric point of the gelatin, the finer the particle size. Moreover, the process of the present invention is not merely a means of providing an extremely fine particle size, but it will be understood that it permits the production of a polymer having a desired particle size range. As pointed out hereinbefore, the obtention of a product characterized by a relatively narrow particle size distribution within a desired range is far more advantageous than merely providing an extremely fine particle size product comprising only a comparatively small fraction of the total polymer produced.

Reference herein to gelatin is for convenience and the term as employed denotes the several forms. Such reference is not intended to exclude from the scope of this invention the use of other suspending agents in combination with gelatin, including various materials such as methyl cellulose, polyvinyl alcohol, gum tragacanth, sodium alginates, and the like. Gelatin may suitably be added to the system in quantity of from about 0.10-0.45 percent by weight of the vinyl chloride monomer and excellent results are obtained in all respects within this range, and especially so if the pH of the system, in the case of the alkali-hydrolyzed material, is reduced to about 2.5-3.5. For example, at pH 2.8, results which are about equally good are obtained by using either about 0.10-0.15 percent or about 0.40-0.45 percent gelatin. However, at about the same pH and with gelatin concentrations of about 0.25-0.35 percent by weight of monomer, an even better result is obtained and for this reason, this latter percentage of gelatin is preferred. Numerous combinations of gelatin and pH may be employed within the range suggested herein for each, but the last-noted combination appears to be optimum.

While the process by which polyvinyl chloride resins may be prepared according to this invention involves the correlation of a substantial number of reaction conditions, the process, in the main, is not difficult to manage as a sustained commercial operation. It is necessary only to observe with care the various conditions that are described herein whereby, it is believed, a product is obtained which is equal to, if not superior to, any known commercial polyvinyl chloride product.

The reaction time is not inordinately long, it requiring less than about 15 hours under preferred conditions and, if desired, the reaction can be speeded up considerably. In order that those interested in preparing resinous materials in accordance with this invention may do so with facility, it is desired to make specific reference to the several variables which are involved, and, further, to call attention to certain precautions that have been found to contribute, at least in a small way, to the overall success of the process. It will be appreciated that the conditions hereinafter referred to may be varied from a particular suggested optimum figure either because the success of the process does not depend upon the maintenance of the condition with such exactness, or because the alteration of a particular condition may be compensated for by the alteration of another condition operating concurrently. Again, it should be noted that specific conditions set forth hereinafter relate particularly to the production of polyvinyl chloride; therefore, where other resinous polymeric materials are produced, it may be found that slightly modified conditions are desirable.

As to the precautions, some of them are well-known in the art and while the complete success of the process is not dependent upon the observance of the precautions, and the invention is not limited to the application of such precautions, their observance is recommended, especially in the production of polyvinyl chloride whereby, in some cases, a better product is produced or a particular difficulty is reduced in its magnitude.

As is well-known, a high polymerization reaction temperature generally results in the production of a material of reduced strength and, therefore, the temperature should be maintained at a level consistent with good molecular weight and adequate speed of the reaction. For example, lauroyl peroxide is an effective catalyst in the polymerization of vinyl chloride and excellent results are thereby obtained by operating at a temperature of about 120°–130° F. This temperature range is in most instances preferred. However, the reaction proceeds with good order at from about 105°–160° F., although about 115°–140° F. is more suitable, since at about 105° F. the reaction is slow, and at temperatures of about 160 F. and above some undesirable fusion of particles may take place.

The invention is not restricted to any particular catalyst, since the reaction conditions suggested do not interfere with the activity of the catalyst and no well-recognized catalyst is known which defeats the ends of the invention. Accordingly, there may be employed, for example, any of the well-known catalysts, such as benzoyl peroxide, lauroyl peroxide, dicaproyl peroxide, acetyl benzoyl peroxide, diacetyl peroxide, p-tertiary-butyl perbenzoate, tertiary butyl perlaurate, di-tertiary-butyl peroxide; organic azo compounds, such as alpha, alpha'-azodiisobutyronitrile and dimethyl alpha, alpha'-azodiisobutyrate are suitable. Each catalyst will have its optimum concentration, that is to say, a concentration sufficient to effect a substantially complete polymerization at a suitable reaction rate. The reaction proceeds without difficulty or disadvantage in the presence of any of the well-known polymerization catalysts with concentrations of 0.10–0.40 percent by weight of the monomer. However, catalyst concentrations of about 0.15–0.30 percent are more suitable because of improved reaction rate and, generally, about 0.20–0.25 percent by weight of monomer is preferred. While the effects of excessive catalyst concentration are not especially notable, it has been observed that an excess tends to produce a material of reduced heat stability, and one having slightly reduced strength characteristics which are apparently due to a reduction in molecular weight. In selecting the catalyst, especially if the end product is to be used in electrical applications where dielectric strength is a factor, care should be taken to select a catalyst which will not be detrimental in this respect and, further, it should not exert an emulsifying effect. The peroxide catalysts are prefenred. Lauroyl peroxide is a suitable and especially effective catalyst.

As will now be understood, the method by which polymerization is accomplished in the practice of this invention involves a critical sequence of process steps. However, before discussing these steps in detail and illustrating their use by example, it will be understood that no particular sequence of initial dispersion of reactants is necessary, although it is believed preferable to add monomer and dispersing agent to water at an elevated temperature, e. g., 35.5° C., somewhat above ambient temperature and then with sufficient agitation to effect a good dispersion. It is a feature of this invention that this initial dispersion be accomplished at a pH in excess of the isoelectric point of the dispersing agent employed, thereby to permit formation of a thoroughly stable dispersion of monomer in the water. Such a dispersion has been found singularly related to the obtention of a controllable particle size distribution in the polymeric material. After an initial stable dispersion is obtained, the present invention, of course, contemplates lowering the pH of the dispersion system to a value less than the pH of the isoelectric point of the amphoteric dispersing agent employed, and effecting polymerization while maintaining such a pH. The polymerization preferably is conducted with the aid of a catalyst and heating, together with continuous agitation.

The reaction may be carried to one hundred percent conversion, or substantially so, if desired, but may also be terminated short of completion as desired or as convenience of plant conditions may dictate. When the reaction is complete to the desired extent, the polymer may be separated from the remaining monomer and reaction medium by known means.

Raw material purity and contamination are quite significant, since important properties of the product may be adversely affected thereby. In particular, aldehydes, phenols, acetylenic compounds, iron and sodium salts, calcium soaps, fatty acids and the like may be in the raw material or enter the system from an outside source and precautions should be taken to insure reasonable to maximum purity at all times.

Various acids may be utilized to effect the desired pH value, the prominent controlling factor in its selection being that it should not impair dielectric properties. Thus, acids such as sulfuric, hydrochloric, phosphoric, citric, oxalic, and acetic are suitable, phosphoric acid being preferred.

The water-monomer ratio in the system is not critical. This ratio may vary from about 1.75–4:1. More suitable, however, due to decrease in volume to be handled, is a water-monomer ratio of about 1.90–3:1, the preferred ratio being about 1.90–2.25:1. All of these ratios are volume ratios.

In order that those skilled in the art may better understand the invention and a method by which the same may be carried into effect, the following specific examples are offered:

EXAMPLE I

Formulation

The following approximate quantities of materials are employed: about 33.3 gallons of deionized, deaerated water, about 16.7 gallons of purified vinyl chloride, about 0.250% (by weight of the monomer) of lauroyl peroxide, about 0.300% (by weight of the monomer) of alkali hydrolyzed gelatin, and about 20 mls. of 85% phosphoric acid.

Procedure

About 31 gallons of deaerated water are charged to a glass-lined jacketed reactor, the water being at room temperature. A vacuum of about 27 inches of mercury is pulled on the reactor and vinyl chloride monomer introduced to the reactor to bring it back to atmospheric pressure. The vacuum treatment is repeated and more vinyl chloride monomer is introduced to the reactor. Gelatin dissolved in a small amount of deaerated water is added and agitation effected for 30 minutes, after which the catalyst is introduced and dispersed for 5 minutes. The monomer is then charged and a stable dispersion formed at a pH above the isoelectric point of the gelatin by agitation for 30 minutes. Phosphoric acid is then added and dispersed by agitation to lower the pH of the system to a value below the isoelectric point of the gelatin.

All valves are then closed, the agitator adjusted to turn at about 250 R. P. M., and the reactor is brought to about 125° F. over about the next two hours and there maintained until the reaction is complete. The system is, of course, under pressure at this point and the pressure remains constant until the reaction is at about 80 percent conversion, at which point a sharp and distinct pressure drop occurs of about 2 to 5 pounds. When this pressure drop occurs, cold water is delivered to the jacket and the system is cooled rapidly to about room temperature. The charge is then blown to a centrifuge and there spun as dry as possible, after which it is washed with about four displacements of water. The mass is then again spun dry, after which it is delivered to trays for final drying. It is then a finished material, ready for processing.

EXAMPLE II

Formulation

The following quantities of materials are employed: 33 gallons of deionized deaerated water, 16.7 gallons of purified vinyl chloride monomer, 0.25% (by weight of monomer) of lauroyl peroxide, 0.3% (by weight of monomer) of alkali hydrolyzed gelatin, and about 20 mls. of 36% HCl.

Procedure

The procedure described in Example I is followed in this example and a product comparable in substantially all respects is obtained.

EXAMPLE III

Formulation

The formulation in this example is comparable to that of Example II, except that 20 mls. of 95% acetic acid are substituted for the hydrochloric acid of Example II.

Procedure

The procedure of Example I is followed and a product substantially comparable to that obtained in Example I is obtained.

As pointed out hereinbefore, the polymer particles obtained in accordance with the practice of this invention are characterized by excellent colloidability and a highly porous structure which enhances their ability to accept plasticizer upon further processing. A typical screen analysis of the product of the method of this invention is as follows:

| Screen: | Percent |
|---|---|
| On 20 mesh | 0 |
| On 40 mesh | 2 |
| On 60 mesh | 3 |
| On 80 mesh | 2 |
| On 100 mesh | 3 |
| On 200 mesh | 45 |
| Thru 200 mesh | 45 |

Those skilled in the art will recognize that this size range provides excellent uniformity of particle size well within the limits permissible by processing methods. Accordingly, the products formed from the polymer are entirely free of the disadvantages mentioned hereinbefore relating to problems that are encountered because of excessive quantities of particles that are too large or too small.

The polymer has excellent dry-blending qualities. For example, it may be mixed with any of the well-known plasticizers, both monomeric and polymeric types, without any tendency to become sticky or syrupy. Examples of such plasticizers are dioctyl phthalate and the polyesters formed by condensation of polyhydric alcohols and dibasic acids, as well as expoxidized unsaturated polyesters.

Products which are formed from granular polymeric material produced as in the above example exhibit outstanding properties in all respects. Because of the substantial absence of large fisheyes and the very small quantity of small fisheyes, sheets, films, and other finished products are unusually strong. Likewise, such products are of excellent clarity.

In the practice of this invention on a commercial scale it will be realized, of course, that a certain amount of time is consumed in heating the monomer-water-dispersant mixture to the desired polymerization temperature. A typical time is one hour and 15 minutes, during which time agitation is continued. The following data indicate the polymerized polyvinyl chloride particle size distribution obtained using 0.3% gelatin by weight of monomer as a dispersant and by varying the periods of delay after the desired polymerization temperature is reached before adding phosphoric acid to produce the system pH.

| Run Time (Hrs.) | Period of Delay (Hrs.) | Particle Size Distribution, Mesh | | | | | Bulk Density, Gms./cc. |
|---|---|---|---|---|---|---|---|
| | | 60 | 80 | 100 | 200 | −200 | |
| 12 | 0 | 2 | 10 | 19 | 62 | 6 | .50 |
| 12½ | 1 | | 3 | 10 | 51 | 35 | .50 |
| 12 | 1½ | | 6 | 12 | 64 | 17 | .56 |
| 12¾ | 2 | | 2 | 10 | 72 | 14 | .51 |

As shown by the above data, a finer particle size distribution is obtained by a longer period of delay in reducing the system pH below the isoelectric point.

While the invention has been described with particular reference to the production of polyvinyl chloride, it may be employed also in the production of polyvinyl chloride copolymers, especially copolymers in which vinyl chloride constitutes at least 85% of the mixture of monomeric materials. Thus, the process of the invention is applicable to processes wherein vinyl chloride is polymerized with other unsaturated monomeric material, such as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, orthochlorostyrene, parachlorostyrene, 2,5-dichlorostyrene, 2,4-dichlorostyrene, paraethyl styrene, divinyl benzene, vinyl naphthalene, alpha-methyl styrene; dienes, such as butadiene, chloroprene; amides, such as acrylic acid amide, acrylic acid anilide, nitriles, such as acrylic acid nitrile; esters of a,B-unsaturated carboxylic acids, for exmple, the methyl, ethyl, propyl, butyl, amyl, hexyl, heptyl, octyl, allyl, methallyl and phenyl esters of maleic, crotonic, itaconic, fumaric acids and the like. The process of the invention is also applicable to vinyl halides broadly, e. g., vinyl chloride, vinyl bromide, etc.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for producing a high quality polymer which comprises intimately mixing in water an ethylenically unsaturated monomer containing at least about 85% vinyl halide and a dispersing agent consisting essentially of gelatin in an amount from about 0.1 to 0.45% by weight of monomer, the resulting solution having a pH at least as high as the isoelectric pH of the gelatin, thoroughly agitating this aqueous polymerization medium to form a stable dispersion of monomer in water, thereafter adding an acid to lower the pH of the aqueous polymerization medium to a value within the range from 2 to 5, inclusive, below the isoelectric pH of the gelatin, and polymerizing said monomer in the thus-formed suspension.

2. The process according to claim 1 wherein said vinyl halide is vinyl chloride.

3. The process according to claim 1 wherein said monomer is vinyl chloride.

4. The process according to claim 1 wherein the agitation of the monomer-water dispersing agent mixture is continued for about 5 minutes to 2 hours before said acid is added.

5. The process according to claim 1 wherein the acid is phosphoric acid.

6. The process according to claim 1 wherein a peroxy polymerization catalyst is added to the aqueous polymerization medium.

References Cited in the file of this patent
UNITED STATES PATENTS

| | | |
|---|---|---|
| 2,528,469 | Condo | Oct. 31, 1950 |
| 2,655,496 | Adams | Oct. 13, 1953 |

U. S. DEPARTMENT OF COMMERCE
PATENT OFFICE

CERTIFICATE OF CORRECTION

Patent No. 2,833,754    Roger G. Richards et al.        May 6, 1958

It is hereby certified that error appears in the printed specification of the above numbered patent requiring correction and that the said Letters Patent should read as corrected below.

Column 2, line 34, for "generaly" read -- generally --; column 7, line 58, for "160 F." read -- 160° F. --; column 8, line 17, for "prefenred" read -- preferred --; column 10, line 24, for "expoxidized" read -- epoxidized --; line 42, for "produce" read -- reduce --; line 74, for "exmple" read -- example --.

Signed and sealed this 24th day of June 1958.

(SEAL)
Attest:

KARL H. AXLINE

Attesting Officer

ROBERT C. WATSON
Commissioner of Patents